United States Patent [19]
Thul

[11] Patent Number: 5,699,587
[45] Date of Patent: Dec. 23, 1997

[54] HANDLE FOR A SANITARY FITTING

[75] Inventor: Alfons Thul, Wittlich, Germany

[73] Assignee: American Standard, Inc., Piscataway, N.J.

[21] Appl. No.: 585,667

[22] Filed: Jan. 16, 1996

[51] Int. Cl.$^6$ .................. A47B 95/02; E05B 1/00
[52] U.S. Cl. .................. 16/114 R; 16/121; 403/353
[58] Field of Search .................. 16/114 R, 121; 403/353, 381, 375; 312/293.3, 265.6

[56] References Cited

U.S. PATENT DOCUMENTS

| 4,593,430 | 6/1986 | Spangler et al. | 16/121 |
| 4,616,673 | 10/1986 | Bondar | 16/121 |

FOREIGN PATENT DOCUMENTS

| 0872653 | 6/1942 | France | 403/353 |
| 0196727 | 3/1908 | Germany | 403/353 |
| 0087546 | 6/1982 | Japan | 403/353 |
| 1599531 | 10/1981 | United Kingdom | 16/121 |

Primary Examiner—Chuck Mah
Attorney, Agent, or Firm—Ann M. Knab; Elaine Brenner Robinson

[57] ABSTRACT

The invention relates to a handle for a sanitary fitting, and particularly to a single-lever sanitary fitting, having a base and a cap, whereby the base of the handle has a handle section and an attachment section. The handle cap can be engaged with and disengaged from the handle base in an area to be covered on the top of the handle section and/or of the attachment section. In order to be able to repeatedly disengage the cap of the handle from the base without there being any risk of damage or without necessitating the use of a tool, there are corresponding locking devices on the base and cap of the handle, which act jointly to combine the base and cap of the handle in such a manner that the cap can placed in mounting direction A onto the area of the base which has to be covered. It is then slid perpendicular to mounting direction A in sliding direction B, establishing a clamping effect between the locking devices, whereby the cap is pushed inward until it covers the entire designated area.

6 Claims, 1 Drawing Sheet

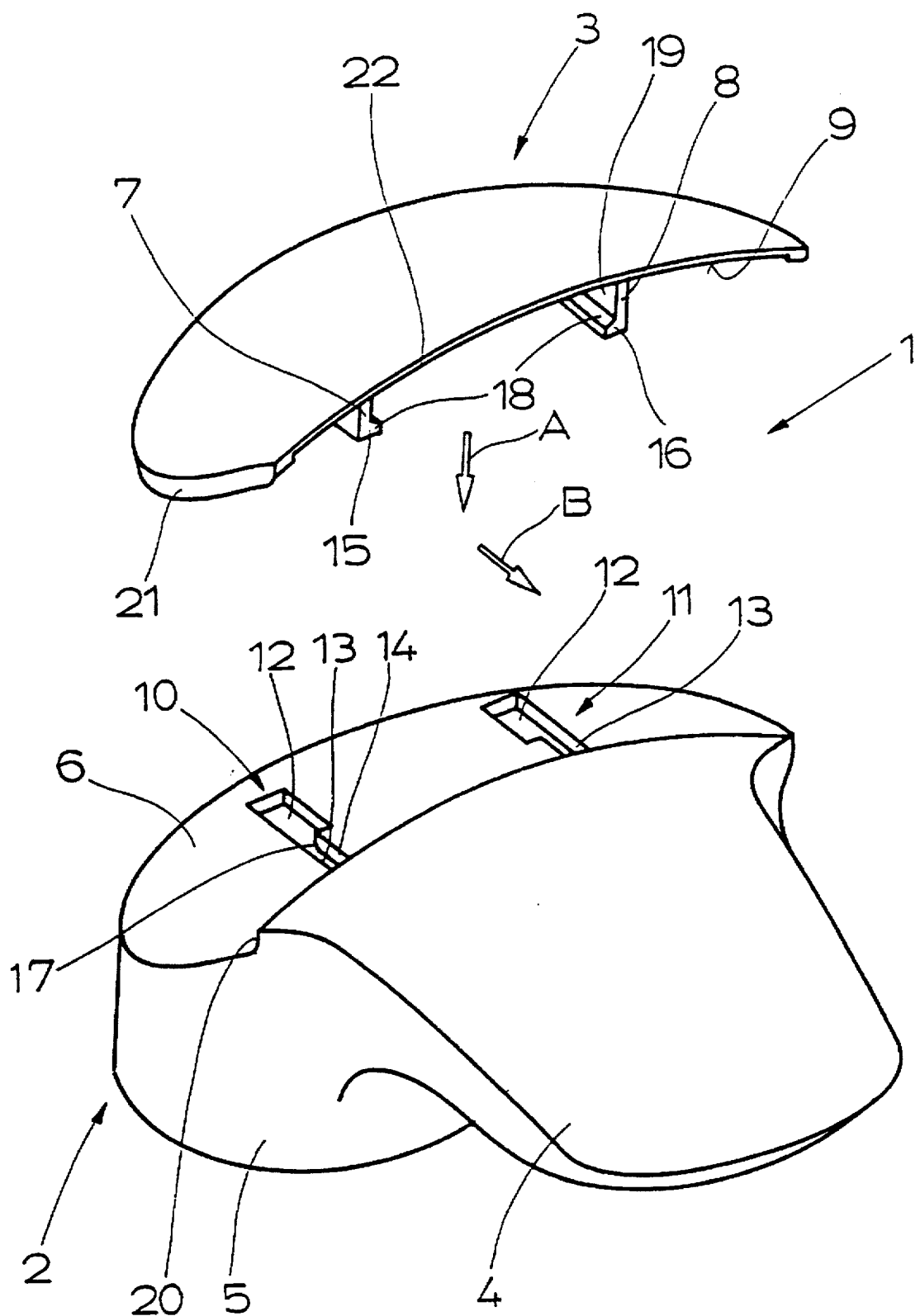

HANDLE FOR A SANITARY FITTING

BACKGROUND OF THE INVENTION

The present invention is directed to a handle for a sanitary fitting, and more particularly, to a single-lever sanitary fitting, with a base and a cap, whereby the base has a handle section and an attachment section, and whereby the cap can be secured to the base in an area, which has to be covered, on the top of the handle section and/or on the attachment section. The cap is secured in position in such a way that it can be loosened.

Handles having base and cap sections have been used in single-lever sanitary fittings for many years. The cap of the handle essentially serves two functions. It is used to cover the attachment or connection point of the handle base with the base of the sanitary fitting. Moreover, it serves an aesthetic function. The cap of the handle may come in a color which is different than the color of the handle base, be composed of a different material or have a particular surface design (including an area of advertising space).

In existing handles, the engaging and disengaging connection between the handle cap and the base of the handle operates in such a manner that the two components are locked together as soon as one is mounted on top of the other. However, when a sanitary fitting is mounted, the handle cap initially locked into place may have to be removed once again, which may prove to be very difficult. It should be noted that there is generally a seal between the cap and the base of the handle. The lock-type connection must be suitably dimensioned in order to achieve an adequate sealing effect between the two components mentioned above. A tool may have to be used for disengaging the lock. In any event, when the lock is being disengaged, the lock-type connection at the base and/or cap of the handle may suffer damage, in particular if a tool is used.

SUMMARY OF THE INVENTION

It is therefore an object of the invention to reduce the chances of damaging the base and cap of a handle in a sanitary fitting during installation or removal thereof.

It is another object of the invention to improve the sealing effect between the handle cap and the handle base.

These and other objects are achieved by the present invention which provides a handle designed in such a manner that there are corresponding locking devices on the base and on the cap of the handle. The locking devices act to connect the handle base and handle cap in such a manner that the cap can be placed in the direction of the area of the base being covered, and can subsequently be slid perpendicular to the direction in which it was originally placed on the base, thereby achieving a clamping effect between the locking devices, until it covers the entire intended area. The engaging and disengaging attachment of the handle cap to the handle base is based in the present invention on a principle which differs completely from the state of the art. The new principle which applies to a handle for a sanitary fitting, whereby the cap is positioned from above and subsequently slid in a perpendicular direction, provides a handle cap that can be easily and repeatedly engaged with and disengaged from the handle base without there being any risk of damage to the locking devices, the handle cap or the handle base. At the same time, the use of a seal between the handle cap and the handle base ensures that a good sealing effect is achieved without any difficulty between the two components by designing the locking devices in an appropriate manner.

A design used to achieve the aforementioned principle which is relatively simple in structural terms, includes at least one limb serving as a first locking device. The limb can be inserted into an opening, which narrows in the direction of sliding and which serves as the second locking device. The narrow opening, which essentially can be located in the cap of the handle, but which is better placed in the base of the handle, ensures that the limb can initially be placed into the opening in the mounting direction without any difficulty, and that a clamping effect is only achieved when the limb is moved in the sliding direction. This applies in particular if the opening has a first section with an opening cross-section which is larger than the corresponding cross-section of the limb, and if a second section of the opening connects onto the first opening area, whereby the limb is frictionally engaged with the edges of the second section of the opening.

In order to prevent the handle cap, which is fully secured in place, from being disengaged inadvertently, the limb is designed with a projection which essentially locks securely under the edge of the second section of the opening, and which can also be frictionally engaged there. This applies in particular if there is a seal between the handle cap and the handle base that is preferably circular. In order to make it easier to slide the handle cap in and out to accommodate any production tolerances, even if it comes complete with a seal, the transition from the first section of the opening to the second section is slanted, and the projection is slanted towards the edge.

The abovementioned clamping effect between the locking devices is particularly straightforward and is easily achieved, given the fact that the limb is spring-mounted in its design. At the same time, any production tolerances which may exist can also be easily compensated for with this spring-mounted design.

A secure clamping effect, without the risk of the handle cap sliding inadvertently on the handle base, is achieved by the fact that there are two limbs and two openings, preferably configured parallel to one another in the direction of sliding. The same effect can also be achieved in designs featuring one limb if the limb is long enough.

The clamping effect between the locking devices can be achieved with the present invention if there is one, or even two limbs, for example by virtue of the fact that the width of the limb is marginally greater than the width of the second section of the opening. In this case, a clamping effect is created on opposite sides of the limb with the corresponding edge of the second section of the opening. If two limbs are used, they should have a spring-mounted design. The distance between the two sides of the limbs directly opposite one another should preferably be marginally smaller than the distance between the two inner surfaces of the edges of the second sections of the opening. Alternatively, applying the same principle, the distance between the two sides of the limbs directly facing one another may be marginally greater than the distance between the two outer surfaces of the edges of the second sections of the opening.

In order to limit sliding in the sliding direction, as well as to serve as a technical seal between the cap and the base of the handle, it would be ideal if the handle cap were in contact with a relief on the base of the handle when the cap is pushed in. It would be particularly appropriate if there was a smooth transition between the handle cap and handle section with as small a joint as possible between these two components. This is ideal both to facilitate cleaning and for aesthetic reasons.

BRIEF DESCRIPTION OF THE DRAWING

The invention will be more fully appreciated from the following detailed description when the same is considered in connection with the accompany drawing which shows a perspective view of a handle for a single-lever sanitary fitting.

DETAILED DESCRIPTION OF THE INVENTION

The sole illustration depicts a perspective view of a handle 1 for a single-lever sanitary fitting, which is not illustrated in detail. The handle 1 has a base 2 and a cap 3. The base 2 of the handle, in turn, has a handle section 4 and an attachment section 5. The handle section 4 is used for operating the sanitary fitting and the attachment section 5 is mounted on and connected to the base of the sanitary fitting after the sanitary fitting is assembled. In order to facilitate this, there is normally an opening on the top of the attachment section 5, which opening is not illustrated here. A connecting element emanating from the base of the single-lever sanitary fitting passes through the afore mentioned opening and is secured in position in the area of the opening, which is not illustrated. The handle cap 3 can be detachably engaged with the handle base 2 in an area 6 which is to be covered. The area 6 being covered is located on the top of attachment section 5. It can cover either all or part of the top of the attachment section 5, and can at the same time extend over all or part of the top of handle section 4.

It is important that corresponding locking devices are included on the base 2 and cap 3 of the handle, acting together to combine the handle base 2 and cap 3 in a very specific manner. This is indicated by the two arrows located between the base of the handle 2 and the handle cap 3. The two components are connected via the locking devices in the following manner. The cap is placed from above in mounting direction A onto the area 6 of the base 2 which has to be covered. The handle cap 3 is then slid perpendicular to mounting direction A in sliding direction B. This serves to establish a clamping effect between the locking devices. The handle cap 3 is slid in direction B until it completely covers the intended area 6.

Two limbs, 7 and 8, are included as first locking devices in the sample design illustrated, whereby the limbs emanate from the underside 9 of the handle cap 3. Openings 10 and 11 which correspond to limbs 7 and 8 serve as second locking devices, whereby the openings are featured on the area 6 being covered on top of the attachment section 5. Openings 10 and 11 each have a first opening section 12, which cross-section is greater than the corresponding (maximum) cross-section of limbs 7 and 8. A second opening section 13 is adjacent to each of the first opening sections 12. The relevant limbs 7 and 8 are frictionally engaged against the edges 14 of the second opening sections 13 when inserted therein.

There are projections, 15 and 16 on each of limbs 7 and 8. Projections 15 and 16 are aligned facing one another. Each of the projections 15 and 16 is designed in such a manner that it essentially locks securely under the edge of the second opening section 13. The connection thereby locks positively in the opposite direction to mounting direction A. A frictionally engaged connection can also be established between the projection and the edge of the second section of the opening or the underside of area 6 being covered in the sliding direction.

A seal can be featured between cap 3 and base 2 of the handle. This seal can be designed as one piece together with the sealing cap 3. However, this can also be a separate component. It would be appropriate if the seal were circular in design.

The transition from the larger first opening section 12 to the smaller second opening section 13 has a slanted edge 17, which makes it easier to push limbs 7 and 8 in sliding direction B into the second opening section 13. Projections 15 and 16 each have a slanted edge 18 facing edge 14.

The cap 3 of the handle can essentially be made from any material. Ideally it should be made from plastic, with limbs 7 and 8 and handle cap 3 all forming one piece. In the present invention, limbs 7 and 8 are spring-mounted in their design. The clamping effect is achieved in the sample design illustrated on account of the fact that the distance between the two sides of the limbs 19 facing one another is marginally smaller than the distance between the two inner surfaces of the edges 14 of the two opening sections 13. Limbs 7 and 8 are pressed against edges 14. It should be mentioned that the clamping effect is not limited to this means and can be achieved by other equivalent means.

There is a relief 20 between the attachment section 5 and the handle section 4. When the cap 3 of the handle is pushed in, it comes into contact with relief 20. The height of the relief 20 and the handle cap 3 are harmonized in order to ensure that the cap 3 fits perfectly into the handle section 4 when it is pushed in, without there being any height discrepancy therebetween.

The detachable connection between the cap 3 and the base 2 of the handle will now be described. The cap 3 of the handle is placed onto the base 2 in mounting direction A. The first opening section 12 is larger than the maximum corresponding cross-section of limbs 7 and 8. Thus, limbs 7 and 8 can be guided through the first opening section 12 without any problems, together with their respective projections 15 and 16. Edge 21 of the cap 3 of the handle is then either directly mounted on top of the attachment section 5 or the section 6 to be covered, or else is indirectly mounted thereto if a seal has been inserted. The cap 3 of the handle is then pushed forward in direction B. The limbs 7 and 8 are pushed outwardly when they reach their corresponding slanted edge 17, creating a friction-tight locking effect between the surfaces 19 and the edges 14. Limbs 7 and 8 will preferably be stretched out in direction B, creating a very high degree of springiness and friction. A friction-tight locking effect can also be generated at the same time between the slanted edges 18 of projections 15 and 16 and the underside of the edge of the second opening section 13, particularly if there is a seal between the cap 3 and the base 2 of the handle. The cap 3 is pushed forward in sliding direction B until its front edge 22 comes into contact with the relief 20. At this point, the handle cap 3 completely covers the intended area 6.

Cap 3 is disengaged from the base 2 of the handle by pushing the cap backwards in the opposite direction to sliding direction B. When limbs 7 and 8 are released from the second opening section 13 and are located in the first opening section 12, they spring back into their original position. The handle cap 3 can be removed from the base 2 by lifting it out in the opposite direction to direction A.

The aforementioned process can be repeated an indefinite number of times without necessitating the use of tools or without any risk of damage occurring to the cap and/or the base of the handle.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A process of engaging a cap to a base in a sanitary fitting wherein said base comprises a handle section and an attachment section, said handle section comprises an uncovered handle area to be covered by said cap wherein said cap can be engaged with and disengaged from said base at said handle area, said base and said cap both comprising a locking means, said base locking means corresponding to said cap locking means when said cap is engaged in said base, comprising:

placing said cap onto said handle area in a first mounting direction perpendicular to said handle area, subsequently sliding said cap into a second mounting direction perpendicular to said first mounting direction to a point whereat it completely covers said uncovered handle area whereby a clamping effect occurs between the base locking means and the cap locking means.

2. A handle for a sanitary fitting comprising:

a base; and a cap;

said base comprising a handle section and an attachment section;

said handle section comprising an uncovered handle area to be covered by said cap, wherein said cap can be engaged with and disengaged from said base at said area;

said base and said cap each comprising a locking means, said base locking means corresponding to said cap locking means, wherein said base locking means and said cap locking means lock together to clamp said cap to said handle area;

said cap locking means comprising at least one limb having a cross-sectional width and said base locking means comprising at least a first opening, wherein said first opening comprises a first section having a cross-section having a cross-sectional width larger than said cross-sectional width of said limb, said first opening further comprising a second section which connects to said first section and whereby said limb is frictionally engaged with an edge of said second section, said limb comprising a projection, said projection locked under an edge of said second section, said projection frictionally engaged with an underside of said edge, said first opening in said handle further comprising a first slanted edge proximate and between said first section and said second section, said projection comprising a second slanted edge, said first slanted edge corresponding to said second slanted edge when said cap is engaged in said base.

3. The handle in accordance with claim 2 wherein said limb has a width and said second section has a width, the width of said limb marginally greater than the width of said second section.

4. The handle in accordance with claim 3 comprising two limbs disposed a first distance apart and two openings disposed a second distance apart.

5. The handle in accordance with claim 4 wherein said base includes a relief section and said cap is in contact with said relief section when said cap is fully pushed against said base.

6. The handle in accordance with claim 5 whereby the cap is flush with the handle such that there is no noticeable discrepancy when passing from said cap to said handle section.

* * * * *